Patented June 5, 1951

2,555,721

UNITED STATES PATENT OFFICE 2,555,721

PROCESS FOR REMOVING FREE PHENOL FROM TETRA-ARYL ORTHOSILICATE

Tibor Wiener, Cambridge, Mass., assignor, by mesne assignments, to California Research Corporation, San Francisco, Calif., a corporation of Delaware No Drawing. Application July 19, 1948, Serial No. 39,589

5 Claims. (Cl. 252—78)

This invention relates to a process for the removal of free phenols from the tetra-aryl orthosilicates.

The tetra-aryl orthosilicates are known as efficient heat transfer media and are described in the patent to Johnston No. 2,335,012 dated November 23, 1943. In this patent processes are described for obtaining the tetra-aryl orthosilicates and it is stated that any residual phenol may be removed therefrom by distillation.

I have found that the presence of free phenols in tetra-aryl orthosilicates is objectionable because phenols are noxious, poisonous and volatile, and because they lower the boiling point of the tetra-aryl orthosilicate. I have further found that in many cases distillation of the tetra-aryl orthosilicate is not practicable for the removal of residual free phenols. By the present invention I provide a novel process for cheaply and easily removing such free phenols without resorting to distillation.

Accordingly, it is the object of the present invention to remove free phenols from the tetra-aryl orthosilicates without distillation by a relatively cheap and easy process not involving expensive equipment and apparatus as is required for distillation.

I have found that if an organic acid anhydride such as benzoic, phthalic or succinic anhydride is added in substantial but smaller quantities to a tetra-aryl orthosilicate and the mixture is then heated that the anhydride reacts with the free phenols present in the tetra-aryl orthosilicate to form higher boiling compounds which have no effect on the heat transfer properties of the tetra-aryl orthosilicate and eliminating the objectionable characteristics of free phenols in the mixture. Any suitable apparatus may be used for mixing and heating the tetra-aryl orthosilicate and the anhydride and no special equipment is required so long as the heating of the tetra-aryl orthosilicate takes place in the absence of air and moisture.

The anhydrides may be added to tetra-aryl orthosilicate at any time and when the tetra-aryl orthosilicate is heated during use the anhydride is present to react with any phenols already present or liberated to react with them to form the higher boiling point compounds.

The process of the present invention therefore produces a tetra-aryl orthosilicate which is free from free phenols. This process is simple and easy to perform and is relatively inexpensive.

By this process an anhydride is combined with the free phenols to convert the free phenols and the anhydride into higher boiling compounds which do not have the objectionable properties of free phenols.

Other anhydrides may now be suggested to those skilled in the art for use in removing free phenols from the tetra-aryl orthosilicates in accordance with this invention without departing from my inventive concept and reference should therefore be had to the appended claims to determine the scope of my invention.

What is claimed is:

1. In a process for removing free phenols from the tetra-aryl orthosilicates the steps of mixing a carboxylic acid anhydride with the tetra-aryl orthosilicate and then heating the mixture until the free phenols and the added anhydride combine to form higher boiling compounds.

2. A process for removing free phenols from the tetra-aryl orthosilicates which includes the steps of mixing benzoic anhydride with the tetra-aryl orthosilicate and then heating the mixture until the free phenols and the benzoic anhydride combine to form higher boiling compounds.

3. A process for removing free phenols from the tetra-aryl orthosilicates which includes the steps of mixing phthalic anhydride with the tetra-aryl orthosilicate and then heating the mixture until the free phenols and the phthalic anhydride combine to form higher boiling compounds.

4. A process for removing free phenols from the tetra-aryl orthosilicates which includes the steps of mixing succinic anhydride with the tetra-aryl orthosilicate and then heating the mixture until the free phenols and the succinic anhydride combine to form higher boiling compounds.

5. A heat transfer medium consisting essentially of tetra-aryl orthosilicates to which a substantial but smaller amount of a carboxylic acid anhydride is added.

TIBOR WIENER.

REFERENCES CITED

The following references are of record in the file of this patent:

UNITED STATES PATENTS

| Number | Name | Date |
|---|---|---|
| 2,335,012 | Johnston | Nov. 23, 1943 |